(12) United States Patent
Kaneko et al.

(10) Patent No.: US 8,034,442 B2
(45) Date of Patent: Oct. 11, 2011

(54) FIBER-REINFORCED PREPREG AND COMPOSITE MATERIAL OBTAINED FROM THE SAME

(75) Inventors: Toru Kaneko, Sunto-gun (JP); Shusuke Sanai, Shizuoka (JP)

(73) Assignee: Toho Tenax Co., Ltd., Chiyoda-Ku (JP)

( * ) Notice: Subject to any disclaimer, the term of this patent is extended or adjusted under 35 U.S.C. 154(b) by 0 days.

(21) Appl. No.: 12/526,705

(22) PCT Filed: Jan. 24, 2008

(86) PCT No.: PCT/JP2008/050938
§ 371 (c)(1), (2), (4) Date: Aug. 11, 2009

(87) PCT Pub. No.: WO2008/120484
PCT Pub. Date: Oct. 9, 2008

(65) Prior Publication Data
US 2010/0092756 A1    Apr. 15, 2010

(30) Foreign Application Priority Data
Mar. 29, 2007  (JP) ................................ 2007-087481

(51) Int. Cl.
*D04H 1/00* (2006.01)
*B32B 25/10* (2006.01)

(52) U.S. Cl. .................................. 428/292.1; 428/295.1

(58) Field of Classification Search .................. None
See application file for complete search history.

(56) References Cited

U.S. PATENT DOCUMENTS

| | | |
|---|---|---|
| 4,812,511 A | 3/1989 | Domeier |
| 4,826,927 A | 5/1989 | Schmid et al. |
| 4,853,449 A | 8/1989 | Domeier |
| 5,037,689 A | 8/1991 | Boyd |
| 5,120,823 A | 6/1992 | Boyd |
| 5,120,824 A * | 6/1992 | Stenzenberger et al. ..... 528/321 |
| 5,189,116 A | 2/1993 | Boyd et al. |
| 5,248,711 A | 9/1993 | Buyny et al. |
| 5,278,224 A | 1/1994 | Olesen et al. |
| 6,313,248 B1 | 11/2001 | Boyd et al. |

FOREIGN PATENT DOCUMENTS

| | | |
|---|---|---|
| JP | 01-201310 A | 8/1989 |
| JP | 01-319514 A | 12/1989 |
| JP | 02-286704 A | 11/1990 |
| JP | 03-197559 A | 8/1991 |
| JP | 03-505893 A | 12/1991 |
| JP | 07-051626 B2 | 6/1995 |
| JP | 08-012856 A | 1/1996 |
| JP | 08-127663 A | 5/1996 |
| JP | 2851351 B2 | 1/1999 |
| JP | 2000-500794 A | 1/2000 |
| JP | 2000-500795 A | 1/2000 |
| JP | 2005-082628 A | 3/2005 |

* cited by examiner

*Primary Examiner* — Angela Ortiz
*Assistant Examiner* — Camie Thompson
(74) *Attorney, Agent, or Firm* — Sughrue Mion, PLLC

(57) ABSTRACT

The present invention provides a prepreg made by impregnating a resin composition into a fiber reinforcing material, the resin composition comprising 50 to 60 parts by weight of an aromatic bismaleimide (A), 30 to 40 parts by weight of an alkenylphenol ether compound (B) expressed by a specific general formula, 5 to 15 parts by weight of an alkenyl aromatic comonomer (C), and 1 to 10% by weight of a thermoplastic resin (D) soluble in (B) or (C) based on the total amount of (A), (B) and (C), the aromatic bismaleimide (A) including 90% by weight or more of bismaleimide diphenylmethane, and a composite material having a glass transition temperature of 260 to 350° C. obtained by heat-curing the prepreg. The invention also provides a prepreg for obtaining a fiber-reinforced composite material excellent in solvent resistance, thermal oxidation resistance and the like while maintaining thermal resistance inherent in an aromatic bismaleimide resin used as a matrix resin and a fiber-reinforced composite material obtained from the prepreg.

11 Claims, No Drawings

FIBER-REINFORCED PREPREG AND COMPOSITE MATERIAL OBTAINED FROM THE SAME

TECHNICAL FIELD

The present invention relates to a fiber-reinforced prepreg and a composite material obtained from it, and more particularly to a fiber-reinforced prepreg to which excellent thermal oxidation resistance properties, solvent resistance, etc. are imparted without spoiling the thermal resistance of an aromatic bismaleimide resin used as a main component of a matrix resin, and a composite material using the prepreg.

BACKGROUND ART

Fiber-reinforced composite materials make the best use of the features of excellent specific strength and specific elasticity and are widely applied to applications such as aviation/space articles. Conventionally, epoxy resins are primarily used as a matrix resin; however, the epoxy resin suffers from the problem of not being able to sufficiently satisfy the requirement of thermal resistance against 200° C. or higher. On the other hand, although polyimides known as a high-temperature resin are excellent in thermal resistance, they cause a problem in formability and thus their practical use to a matrix resin is behind.

In these situations, bismaleimide resins such as aromatic bismaleimide-based resins excellent in balance between thermal resistance and moldability are paid to attention as a matrix resin for fiber-reinforced composite materials such as carbon fibers. However, bismaleimide resins have the defect of low toughness, and therefore their applications are considerably limited. Although a method of blending a rubber component or a thermoplastic resin and a method of copolymerizing other monomers are proposed as a method of improving this defect of bismaleimide resins, the resin has created problems such as the improvement of toughness being insufficient as compared to a decrease in physical properties such as thermal resistance being large.

For example, Japanese Patent Laid-Open No. 3-197559 (Patent Document 1) discloses a prepreg excellent in impact resistance properties including an aromatic bismaleimide-based resin, alkenylphenol or an alkenylphenoxy group-containing comonomer and a soluble thermoplastic polyimide resin. However, it has been ascertained that thermal oxidation resistance properties and solvent resistance (MEK) characteristics of a fiber-reinforced composite material are insufficient in the disclosed resin composition.

In addition, Japanese Patent Laid-Open No. 8-127663 (Patent Document 2) discloses a prepreg excellent in impact resistance properties including a polyfunctional maleimide-based resin 50% by weight of which is present as a solid, alkenylphenol and/or an alkenylphenol ether compound and a thermoplastic resin molded material, wherein the thermoplastic resin molded material does not dissolve in the resin composition and is present on the prepreg surface. However, it is apparent that the glass transition temperature and thermal oxidation resistance properties of a fiber-reinforced composite material are insufficient in the disclosed resin composition.

Patent Document 1: Japanese Patent Laid-Open No. 3-197559
Patent Document 2: Japanese Patent Laid-Open No. 8-127663

DISCLOSURE OF THE INVENTION

The present inventors have found that the use of a resin composition including a certain specific bismaleimide resin, a specific alkenylphenol ether compound and a soluble thermoplastic resin makes it possible to effectively improve thermal oxidation resistance properties, solvent resistance, and the like without spoiling the thermal resistance of a bismaleimide resin. In addition, this bismaleimide resin-based resin composition was found to be very excellent for a fiber-reinforced prepreg and a composite material.

Thus, an object of the present invention is to provide a fiber-reinforced prepreg and a composite material which are used as main components of a matrix resin and to which excellent thermal oxidation resistance properties, solvent resistance, and the like are imparted without spoiling thermal resistance that is a characteristic of an aromatic bismaleimide resin.

The present invention is a prepreg made by impregnating a resin composition into a fiber reinforcing material, the resin composition including 50 to 60 parts by weight of an aromatic bismaleimide (A), 30 to 40 parts by weight of an alkenylphenol ether compound (B) expressed by formula (1) below, 5 to 15 parts by weight of an alkenyl aromatic comonomer (C), and 1 to 10% by weight of a thermoplastic resin (D) soluble in (B) or (C) based on the total amount of (A), (B) and (C), wherein the above aromatic bismaleimide (A) includes 90% by weight or more of bismaleimide diphenylmethane. In addition, another aspect of present invention is also a composite material having a glass transition temperature of 260 to 350° C. that is obtained by heat-curing this prepreg.

[Chemical 1]

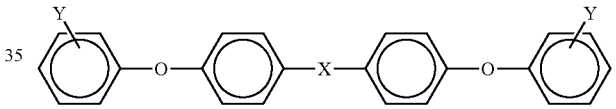

(Formula 1)

In formula 1, X represents CO, $CH_2$ or $C(CH_3)_2$ and Y represents the same or mutually different alkenyl group.

A prepreg and a composite material having as a matrix resin a resin composition including an aromatic bismaleimide resin of the present invention has excellent thermal oxidation resistance properties, solvent resistance, and the like without spoiling the excellent thermal resistance of the matrix resin. Hence, a prepreg and a composite material of the present invention can be suitably used for structural materials for aircrafts and the like.

In the present invention, the addition of an alkenylphenol ether compound (B) is indispensable so that the resulting composite material may exhibit and maintain thermal oxidation resistance properties of 260° C. or higher (glass transition temperature, and the like.). In addition, if a bismaleimide other than bismaleimide diphenylmethane is present in an amount exceeding 10% by weight in an aromatic bismaleimide (A) component, the solvent resistance (determined by MEK resistance properties) worsens. Additionally, unless a thermoplastic resin (D) soluble in component (B) or component (C) is added in an amount of 1% by weight or more, preferably 2% by weight or more, based on the total amount of components (A), (B) and (C), cracks are liable to occur. The addition exceeding 10% by weight increases the viscosity of the resin composition and causes the problem of spoiling the tack properties of a prepreg using this resin composition, and hence an addition of 1 to 10% by weight is suitable.

A composite material of the present invention has a performance of taking 800 hours or more until the weight decreases by 2% in the measurement of weight decrease at 260° C. Moreover, the in-plane shear modulus retention of a carbon fiber-reinforced composite material of the present invention in 6-day immersion is 90% or more, an excellent performance, in its in-plane shear modulus measurement after its immersion in an MEK solvent.

BEST MODE FOR CARRYING OUT THE INVENTION

A resin composition used in the present invention comprises 50 to 60 parts by weight of an aromatic bismaleimide (A), 30 to 40 parts by weight of an alkenylphenol ether compound (B) expressed by formula (1) above, 5 to 15 parts by weight of an alkenyl aromatic comonomer (C), and 1 to 10% by weight of a thermoplastic resin (D) soluble in (B) or (C) based on the total amount of (A), (B) and (C), wherein the above aromatic bismaleimide (A) includes 90% by weight or more of bismaleimide diphenylmethane.

The ratio of (A) to (B) to (C) of the above resin composition is 50 to 60 parts by weight: 30 to 40 parts by weight: 5 to 15 parts by weight, preferably 50 to 55 parts by weight: 32 to 38 parts by weight: 10 to 15 parts by weight. (D) is 1 to 10 parts by weight, preferably 2 to 8 parts by weight, based on 100 parts by weight of the total amount of (A), (B) and (C). Other well-known, various additives can optionally be added to the above resin composition within the scope of not losing the object and advantages of the present invention.

A prepreg of the present invention is made by impregnating the above resin composition into a fiber reinforcing material. The fiber reinforcing material is not particularly limited and specific examples include carbon fibers, glass fibers, aramid fibers, boron fibers, silica fibers, and the like. These fibers may be any of continuous fibers and discontinuous fibers. These fiber reinforcing materials may be used alone or in combination of two or more kinds. When a carbon fiber is used as a fiber reinforcing material, the effect is particularly remarkable in the present invention.

An aromatic bismaleimide of component (A) of the present invention can be obtained by a well-known method in which a corresponding aromatic diamine reacts with maleic anhydride. An aromatic bismaleimide is preferably soluble in an alkenylphenol ether compound of component (B) expressed by equation (1) above, particularly 4,4'-bis-(-o-propenylphenoxy)-benzophenone.

Aromatic bismaleimides specifically can include 4,4'-bismaleimide diphenylmethane, 3,3'-bismaleimide diphenylmethane, m-phenylenebismaleimide, 4-methyl-1,3-phenylenebismaleimide, p-phenylenebismaleimide, m-toluylenebismaleimide, and the like. Particularly preferred are 4,4'-bismaleimide diphenylmethane, 3,3'-bismaleimide diphenylmethane, or mixtures thereof. When these are used, products excellent in thermal resistance for resin and solvent-resistant properties after curing are obtained.

In the present invention, the above aromatic bismaleimide (A) needs to include 90% by weight or more of bismaleimide diphenylmethane. If a bismaleimide other than bismaleimide diphenylmethane is present in an amount exceeding 10% by weight in component (A), the solvent resistance (determined by MEK resistance properties) worsens, so that the case is unsuitable. In particular, the content of bismaleimide diphenylmethane in the entire resin composition is preferably in the range of 40 to 50% by weight.

An alkenylphenol ether compound of component (B) of the present invention is expressed by formula (1) above. In formula (1), X is CO, $CH_2$ or $C(CH_3)_2$, and Y are the same or mutually different alkenyl groups such as vinyl groups, 1-propenyl groups and 2-propenyl groups. X is preferably CO, and the alkenyl group is preferably a 1-propenyl group, a 2-propenyl group or a mixture thereof. Component (B) may be a single component or a mixture. In the present invention preferred are specifically 4,4'-bis-(alkenyl phenoxy)-benzophenone. Of these, 4,4'-bis-(-o-propenylphenoxy)-benzophenone is preferred due to its high glass transition point after curing and high thermal oxidation resistance at 260° C.

The above alkenylphenol ether compound is a well-known one or a compound that can be produced by a well-known method. For instance, 4,4'-bis-(-o-propenylphenoxy)-benzophenone is commercially available from Degussa Corporation as "Compimide™-123" (trade name of Degussa Corp.).

Alkenyl aromatic comonomers of component (C) of the present invention can include styrene, 1,4-divinylbenzene, a diallyl phthalate monomer, triallyl isocyanurate, glyceryl triacrylate, and the like. Of these, a diallyl phthalate monomer and triallyl isocyanurate are preferred from the viewpoints of low viscosities, and resin thermal resistance and solvent-resistant properties after curing.

Thermoplastic resins of component (D) of the present invention can include polyetherimides, polyethersulfones, polysulfones, polyimides containing a residue of phenylindane, and the like. Of these, polyetherimides and soluble polyimides containing the residues of BTDA and 5(6)-amino-1-(4'-aminophenyl)-1,3,3-trimethylindane in the repeating unit are preferable. One example of soluble polyimides containing the residues of BTDA and 5(6)-amino-1-(4'-aminophenyl)-1,3,3-trimethylindane in the repeating unit can include "Matrimide5218" available from Huntsman Corp. In addition, one example of polyetherimides can include "Ultem" (trade name of GE Corp.) available from GE Corp. Polyetherimides preferably include a polyetherimide having a number average molecular weight of 3,000 to 50,000.

Particulates of polyimide (E) having a glass transition temperature of 270° C. or higher may be further added as another component used in the present invention. Particulates of such polyimide (E) are preferably insoluble in a resin composition including the aromatic bismaleimide (A), the alkenylphenol ether compound (B) and the alkenyl aromatic comonomer (C).

The particulation of polyimide (E) having a glass transition temperature of 270° C. or higher is made by pulverization and classification by means of a pulverizer. Particulation can uniformly disperse particulates of polyimide (E) in a mixture of a resin composition including the aromatic bismaleimide (A), the alkenylphenol ether compound (B), the alkenyl aromatic comonomer (C) and the thermoplastic resin (D). In particular, the particulates having a particle diameter of 50 µm or less are preferred. More preferable is a particle diameter of 1 to 20 µm. When the particle diameter exceeds 50 µm, particles are caught by clearances of doctor blades in a step of making a resin mixture of a prestage of producing a prepreg a thin film, so that a uniform resin film cannot be made in some cases and thus the case is unpreferable.

The amount of addition of particulates of polyimide (E) having a glass transition temperature of 270° C. or higher is from 5 to 15 parts by weight based on 100 parts by weight of a resin mixture including the aromatic bismaleimide (A), the alkenylphenol ether compound (B) and the alkenyl aromatic comonomer (C). The amount is preferably from 5 to 10 parts by weight. The reason why the amount of addition of polyimide (E) having a glass transition temperature of 270° C. or higher is set to be in the range is that, when the amount of addition is 15 parts or more, the viscosity of the resin composition is increased, thereby posing the problem of spoiling the tack properties of a prepreg that uses the present resin composition. Moreover, when the amount of addition is 5 parts by weight or less, the improved effect of the open-hole compression properties of the composite characteristics is insufficient.

A prepreg used in the present invention may be any prepreg and is not particularly limited. A prepreg refers to a molding intermediate material the handleability of which is made good by impregnating a matrix resin into a fiber reinforcing material and removing flowability and adhesiveness. In the present invention, the form of a fiber reinforcing material that forms a prepreg is not particularly limited. A fiber reinforcing material is typically, for example, made up of the warp and the weft such as by plain weave, twill weave, or long shaft weave. Besides, the material is used in forms such as a uniaxial fabric made by stretching a fiber bundle in one direction to form a sheet shape and suturing it with a stitch thread in the perpendicular direction, a multi-axial woven fabric made by laminating a plurality of sheet materials stretched in one direction by changing their directions and suturing them with a stitch thread in the perpendicular direction, and the like. Alternately, a material made by stretching a fiber bundle (strand) in parallel in one direction to form a sheet shape and impregnating a resin thereinto, a tape-like prepreg (bias tape prepreg) made by arranging fiber bundles in ±45 degrees and impregnating a resin into it, or the like may be allowable. The content of a resin in a prepreg is typically in the range of 20 to 50% by weight.

Another aspect of the present invention is a composite material having a glass transition temperature of 260 to 350° C. obtained by heat-curing a prepreg made by impregnating a resin composition into a fiber reinforcing material, the resin composition including 50 to 60 parts by weight of the aromatic bismaleimide (A), 30 to 40 parts by weight of the alkenylphenol ether compound (B) expressed by formula (1) below, 5 to 15 parts by weight of the alkenyl aromatic comonomer (C), and 1 to 10% by weight of the thermoplastic resin (D) soluble in (B) or (C) based on the total amount of (A), (B) and (C), the above aromatic bismaleimide (A) including 90% by weight or more of bismaleimide diphenylmethane.

The above thermal curing is preferably curing in two stages of pre-curing and post-curing at 200 to 300° C. Typically, pre-curing is carried out at 200° C. or less using a molding die and post-curing is performed at 200 to 300° C. after demolding, preferably at 200 to 370° C. Post-curing may be carried out, as required, in a plurality of numbers.

In addition, also for this aspect of the present invention, the above alkenylphenol ether compound (B) is preferably 4,4'-bis-(alkenyl phenoxy)-benzophenone.

The content of bismaleimide diphenylmethane in the above resin composition is preferably in the range of 40 to 50% by weight, and bismaleimide diphenylmethane is preferably 4,4'-bismaleimide diphenylmethane, 3,3'-bismaleimide diphenylmethane, or a mixture of these.

The above thermoplastic resin (D) is also preferably a polyetherimide, a polyimide containing a residue of phenylindane or a mixture of these.

Additionally, the above resin composition may contain 5 to 15% by weight of particulates of polyimide (E) having a glass transition temperature of 270° C. or higher based on the total amount of (A), (B) and (C). The particulates of polyimide (E) having a glass transition temperature of 270° C. or higher is preferably insoluble in the above resin composition.

The composite material of the present invention can be obtained from the prepreg obtained by the invention described in claim 1 by means of usual, various thermal curing means and methods. For example, a composite material is typically obtained by heating and/or pressurization by means of a heating and curing oven by use of a die. The heating and pressurizing method by heating or a curing oven is not particularly limited and the examples include methods such as by molding with a usual autoclave, hot press molding, and molding by use of a heat-curing oven. The molding conditions suitably include a pressure of 0.05 to 4 MPa, a temperature of 80 to 200° C. and a time of 1 to 3 hours. After the prepreg is thermally cured, the die is cooled and then a molded product is demolded and taken out. Preferably, thereafter, without further use of the die, the molded product is allowed to freely stand and post-cured at 200 to 300° C. to thereby obtain a molded product having a glass transition temperature of 260° C. to 350° C. (composite material).

The composite material of the present invention obtained by the method as described above that uses a carbon fiber for a fiber reinforcing material has an excellent performance of taking 800 hours or more to reduce the weight by 2% for the weight loss rate in the weight loss measurement at 260° C. Moreover, in the in-plane shear modulus measurement after immersion of the composite material in an MEK solvent, the composite material has an excellent performance of the in-plane shear modulus retention after 6-day immersion being 90% or more.

Example

Hereinafter, the present invention will be described in detail by way of example. % and parts are all by weight. In the present invention, the weight loss measurement at 260° C. of a carbon fiber-reinforced composite material (CFRP) used a carbon fiber-reinforced composite material with a width of 50 mm, a length of 50 mm, a thickness of 3 mm and a volume content (vf) of a carbon fiber of 50 to 60%. The weight (W1) of a carbon fiber-reinforced composite material before heat treatment was measured, the composite was allowed to stand in an oven at 260° C. under an air atmosphere, the weight (W2) of the carbon fiber-reinforced composite material was measured at intervals of 100 hours, and the weight loss rate was determined by the formula noted below. Then, the time until the weight was decreased by 2% by weight was measured and was made a measure for thermal oxidation resistance properties. In addition, the weight measurement was carried out at a temperature of 23° C. Weight loss rate (%)= $[(W1-W2) \div W1] \times 100$ Moreover, for MEK resistance properties of a carbon fiber-reinforced composite material, the retention of the in-plane shear modulus was measured in accordance with JIS K 7079 (A method) and made a measure for MEK resistance properties. In other words, the in-plane shear modulus (G1) before immersion in a methyl ethyl ketone (MEK) solution and the in-plane shear modulus (G2) after 6-day immersion in a methyl ethyl ketone solution at 23° C. were measured to determine the shear modulus retention using the following calculation formula. The MEK resistance properties were determined to be good in the case where the retention of the in-plane shear modulus was 90% or more.

Retention (%)=$(G2 \div G1) \times 100$

Examples 1 to 3

35 parts of 4,4'-bis-o-propenylphenoxy-benzophenone (Compimide™123: available from Degussa Corp.), 4 parts of a diallyl phthalate monomer (available from Daiso Co., Ltd.), 9 parts of triallyl isocyanurate (TAIC: available from Nippon Kasei Chemical Co., Ltd.), 2 parts (Example 1), 5 parts (Example 2) or 10 parts (Example 3) of polyether imide (Ultem 1000: available from GE Corp.) were mixed at 120° C. for 60 minutes and were completely dissolved to prepare respective resin compositions (1). Respective resin compositions (1) and 52 parts of bismaleimide resin containing 90% or more of 4,4'-bismaleimide diphenylmethane (BMI-H: available from K.I Chemical Industry Co., Ltd.) were kneaded using a roll mill at 100° C. to prepare resin compositions (2) of the present invention.

Example 4

The same resin composition (1) as in Example 2 was kneaded with 52 parts of bismaleimide resin containing 90% or more of 4,4'-bismaleimide diphenylmethane (BMI-H: available from K.I Chemical Industry Co., Ltd.) and 10 parts of a polyimide powder having an average particle diameter of 10 μm (UIP-R: available from Ube Industries, Ltd.) using a roll mill at 100° C. to prepare resin composition (2) of the present invention.

Example 5

35 parts of 4,4'-bis-o-propenylphenoxy-benzophenone (Compimid™123: available from Degussa Corp.), 4 parts of a diallyl phthalate monomer (available from Daiso Co., Ltd.), 9 parts of triallyl isocyanurate (TAIC: available from Nippon Kasei Chemical Co., Ltd.) and 5 parts of a soluble polyimide (Matrimide5218: available from Huntsman Corp.) were mixed at 120° C. for 60 minutes and were completely dissolved to prepare respective resin composition (1). This resin composition (1) and 52 parts of bismaleimide resin containing 90% or more of 4,4'-bismaleimide diphenylmethane (BMI-H: available from K.I Chemical Industry Co., Ltd.) were kneaded using a roll mill at 100° C. to prepare resin compositions (2) of the present invention.

Each resin composition (2) of Examples 1 to 5 above was impregnated into W-3101 of a carbon fiber fabric (available from Toho Tenax Co., Ltd.) using a prepreg-making device to produce a fabric prepreg. The mass per unit area of the carbon fiber of the prepreg was 200 g/m$^2$ and the resin content was 40%.

The prepregs obtained above were cut out to a given size and were laminated to [(±45)/(0, 90)/(±45)/(0, 90)]2 s and the resulting materials were molded by autoclave molding at 180° C. for 3 hours at 5 atmospheric pressure. The molded materials were cured after demolding at 210° C. for 6 hours, 250° C. for 4 hours and 270° C. for 5 hours in an oven to fabricate test pieces. Open hole compression strengths (OHC) were measured for these test pieces in accordance with SRM2 of SACMA. The results were shown in Table 1.

Each of the prepregs obtained in Examples 1 to 5 above was laminated to (±45) by four layers and the resulting laminate was molded by autoclave molding at 180° C. for 3 hours at 5 atmospheric pressure. The molded material was cured after demolding at 210° C. for 6 hours, 250° C. for 4 hours and 270° C. for 5 hours in an oven to fabricate a test piece. The in-plane shear modulus was measured in accordance with JIS K 7079 (method A) and the value of the retention rate of the in-plane shear modulus before and after its immersion in a methyl ethyl ketone solution was shown in Table 1 as a measure of the MEK resistance properties.

Each of the prepregs obtained in Examples 1 to 5 above was laminated to [(±45)/(0, 90)/(±45)/(0, 90)]2 s and the resulting material was molded by autoclave molding at 180° C. for 3 hours at 5 atmospheric pressure. The molded materials was cured after demolding at 210° C. for 6 hours, 250° C. for 4 hours and 270° C. for 5 hours in an oven to fabricate a test specimen. The test specimen was cut into a size with a width of 50 mm, a length of 50 mm and a thickness of 3 mm to obtain a test piece. The result of the weight loss measurement at 260° C. was shown in Table 1 as a measure of thermal oxidation resistance properties.

The fabrication of a test piece for glass transition temperature measurement was carried out in the following. The prepregs obtained in Examples 1 to 5 above were laminated to (0, 90) by 10 layers and the resulting laminates were molded by autoclave molding at 180° C. for 3 hours at 5 atmospheric pressure. The molded materials were cured after demolding at 210° C. for 6 hours, 250° C. for 4 hours and 270° C. for 5 hours in an oven to fabricate test pieces. The fabric molded sheets were each measured by the 3-point bending method at a frequency of 1 Hz at a rate of temperature rise of 5° C./min using a dynamic viscoelasticity measuring device (Rheogel-E4000) available from UBM Co., Ltd. The peak of loss elastic modulus (E") was taken as the glass transition temperature. The results were shown in Table 1.

For generation states of cross-sectional cracks of carbon fiber-reinforced composite materials, each of the prepregs obtained in Examples 1 to 5 above was laminated to [(±45)/(0, 90)/(±45)/(0, 90)]2 s and the resulting material was molded by autoclave molding at 180° C. for 3 hours at 5 atmospheric pressure. After the molded material was demolded, the cross section of a test specimen post-cured at 210° C. for 6 hours, at 250° C. for 4 hours and at 270° C. for 5 hours in an oven was mirror-polished and observed under a microscope at a magnification of 200×. The cross section of about 3 mm in width and 10 mm in length was observed, and the generation conditions of cracks were observed.

Comparative Example 1

A test piece was fabricated as in Example 2 except that Compimide796 (available from Degussa Corp.) was used as the aromatic bismaleimide instead of BMI-H (available from K.I Chemical Industry Co., Ltd.) and evaluated as in the case of the examples. The results were shown in Table 2. In addition, Compimide 796 is a mixture of 4,4'-bismaleimide diphenylmethane and 4-methyl-1,3-phenylenebismaleimide and contains about 60% of 4,4'-bismaleimide diphenylmethane.

Comparative Example 2

A test piece was fabricated as in Example 2 except that 4-methyl-1,3-phenylenebismaleimide (BMI-7000: available from Daiwakasei Industry Co., Ltd.) together with BMI-H was used as the aromatic bismaleimide and evaluated as in the case of the examples. The results were shown in Table 2.

Comparative Example 3

A test piece was fabricated as in Example 2 except that resin composition (1) was prepared without addition of polyether imide (Ultem 1000: available from GE Corp.) and evaluated as in the case of the examples. The results were shown in Table 2.

Comparative Example 4

A test piece was fabricated as in Example 2 except that O,O'-diaryl bisphenol A that is an alkenylphenol (Matrimid-5292B: available from Huntsman Corp.) was used instead of Compimide™123 (available from Degussa Corp.) and evaluated as in the case of the examples. The results were shown in Table 2.

Comparative Example 5

A test piece was fabricated as in Example 2 except that the blending quantities of BMI-H (available from K.I Chemical Industry Co., Ltd.) and Compimid™123 (available Degussa Corp.) were changed and evaluated as in the case of the examples. The results were shown in Table 2.

As shown in Table 1, the test pieces that used the prepregs of Examples 1 to 5 were excellent in thermal resistance, thermal oxidation resistance properties, MEK resistance properties and crack resistance properties. The test pieces of Comparative Examples that are outside the scope of the present invention had problems of, for example, being low in thermal oxidation resistance properties, MEK resistance properties, and crack resistance properties. In particular, the resin composition that does not dissolve the polyether imide obtained the result of open hole compression strength (OHC) and crack resistance properties being inferior (Comparative Example 3). Moreover, the resin compositions in which the contents of 4,4'-bismaleimide diphenylmethane are small obtained the result of MEK resistance properties being inferior (Comparative Examples 1 and 2). In addition, for the glass transition point, a decrease in Tg due to the addition of a thermoplastic resin was not observed.

In Tables 1 and 2, BMI-His a bismaleimide resin containing 90% or more of 4,4'-bismaleimide diphenylmethane. Compimide 796 is a mixture of 4,4'-bismaleimide diphenylmethane and 4-methyl-1,3-phenylenebismaleimide and contains about 60% of 4,4'-bismaleimide diphenylmethane. BMI-7000 is 4-methyl-1,3-phenylenebismaleimide (BMI-7000: available from Daiwakasei Industry Co., Ltd.). Matrimid 5218 is a soluble polyimide (available from Huntsman Corp.). The polyether imide is Ultem 1000 (available from GE Corp.). The alkenylphenol is O,O'-diaryl bisphenol A (Matrimid 5292B: available from Huntsman Corp.).

TABLE 1

| | | Example 1 | Example 2 | Example 3 | Example 4 | Example 5 |
|---|---|---|---|---|---|---|
| (A) Compound aromatic bismaleimide | BMI-H | 52 | 52 | 52 | 52 | 52 |
| | Compimide 796 | | | | | |
| (B) Compound | TM 123 | 35 | 35 | 35 | 35 | 35 |
| (C) Alkenyl aromatic monomer | Diallyl phthalate monomer | 4 | 4 | 4 | 4 | 4 |
| (C) Alkenyl aromatic monomer | Triallyl isocyanurate | 9 | 9 | 9 | 9 | 9 |
| (D) Thermoplastic resin | Polyetherimide | 2 | 5 | 10 | 5 | |
| (D) Thermoplastic resin | Soluble polyimide (Matrimid 5218) | | | | | 5 |
| (E) Polyimide particulate | Polyimide UP-R | | | | 10 | |
| CFRP physical properties | Open hole compression strength (OHC) | 285 | 288 | 285 | 303 | 288 |
| | MEK resistance properties | 92 | 92 | 92 | 93 | 93 |
| | Time until CFRP weight is decreased by 2 wt % at 260° C. | 1000 | 1000 | 1000 | 1100 | 1000 |
| | Tg (° C.) | 315 | 313 | 312 | 312 | 313 |
| | Crack in CFRP cross section | None | None | None | None | None |
| Reference: % by weight of bismaleimide phenylmethane based on the whole | | 46 | 45 | 43 | 42 | 45 |

TABLE 2

| | | Comparative Example 1 | Comparative Example 2 | Comparative Example 3 | Comparative Example 4 | Comparative Example 5 |
|---|---|---|---|---|---|---|
| (A) Compound aromatic bismaleimide | BMI-H | | 40 | 52 | 52 | 65 |
| | Compimide 796 | 52 | | | | |
| | BMI-7000 | | 12 | | | |
| (B) Compound | TM 123 | 35 | 35 | 35 | | 22 |
| (B) Other compounds | Alkenylphenol | | | | 35 | |
| (C) Alkenyl aromatic monomer | Diallyl phthalate monomer | 4 | 4 | 4 | 4 | 4 |
| (C) Alkenyl aromatic monomer | Triallyl isocyanurate | 9 | 9 | 9 | 9 | 9 |
| (D) Thermoplastic resin | Polyether imide | 5 | 5 | | 5 | 5 |
| (D) Thermoplastic resin | Soluble polyimide (Matrimid 5218) | | | | | |

TABLE 2-continued

|  |  | Comparative Example 1 | Comparative Example 2 | Comparative Example 3 | Comparative Example 4 | Comparative Example 5 |
|---|---|---|---|---|---|---|
| CFRP physical properties | Open hole compression strength (OHC) | 285 | 283 | 255 | 230 | Prepreg was unable to be fabricated due to high resin viscosity |
|  | MEK resistance properties | 80 | 83 | 92 | 90 |  |
|  | Time until CFRP weight is decreased by 2 wt % at 260° C. | 900 | 900 | 700 | 400 |  |
|  | Tg (° C.) | 310 | 310 | 310 | 290 |  |
|  | Crack in CFRP cross section | None | None | Present | Present |  |
| Reference: % by weight of bismaleimide phenylmethane based on the whole |  | 30 | 36 | 47 | 47 | 53 |

The invention claimed is:

1. A prepreg made by impregnating a resin composition into a fiber reinforcing material, the resin composition comprising 50 to 60 parts by weight of an aromatic bismaleimide (A) containing 90% by weight or more of 4,4'-bismaleimide diphenylmethane or 3,3'-bismaleimide diphenylmethane or a mixture of these, 30 to 40 parts by weight of 4,4'-bis-(alkenylphenoxy)-benzophenone (B), 5 to 15 parts by weight of an alkenyl aromatic comonomer (C) and 1 to 10% by weight of a polyether imide or a polyimide containing the residue of phenylindane or a mixture of these (D) based on the total amount of (A), (B) and (C).

2. The prepreg made by impregnating the resin composition into the fiber reinforcing material according to claim 1, wherein the content of bismaleimide diphenylmethane in the resin composition is in the range of 40 to 50% by weight.

3. The prepreg made by impregnating the resin composition into the fiber reinforcing material according to claim 1, wherein the resin composition includes 5 to 15% by weight of particulates of polyimide (E) having a glass transition temperature of 270° C. or higher based on the total amount of (A), (B) and (C).

4. The prepreg made by impregnating the resin composition into the fiber reinforcing material according to claim 3, wherein the particulates of polyimide (E) having the glass transition temperature of 270° C. or higher are insoluble in the resin composition.

5. The prepreg made by impregnating the resin composition into the fiber reinforcing material according to claim 1, wherein the alkenyl aromatic comonomer (C) is styrene, 1,4-divinylbenzene, a diallyl phthalate monomer, triallyl isocyanurate or glyceryl triacrylate.

6. A composite material having a glass transition temperature of 260 to 350° C. obtained by heat-curing a prepreg made by impregnating a resin composition into a fiber reinforcing material, the resin composition comprising 50 to 60 parts by weight of an aromatic bismaleimide (A) containing 90% by weight or more of 4,4'-bismaleimide diphenylmethane or 3,3'-bismaleimide diphenylmethane or a mixture of these, 30 to 40 parts by weight of 4,4'-bis-(alkenylphenoxy)-benzophenone (B), 5 to 15 parts by weight of an alkenyl aromatic comonomer (C) and 1 to 10% by weight of a polyether imide or a polyimide containing the residue of phenylindane or a mixture of these (D) based on the total amount of (A), (B) and (C).

7. The composite material according to claim 6, wherein the heat curing is carried out in two stages of pre-curing and post-curing at 200 to 300° C.

8. The composite material according to claim 6, wherein the content of the bismaleimide diphenylmethane in the resin composition is in the range of 40 to 50% by weight.

9. The composite material according to claim 6, wherein the resin composition includes 5 to 15% by weight of particulates of polyimide (E) having the glass transition temperature of 270° C. or higher based on the total amount of (A), (B) and (C).

10. The composite material according to claim 9, wherein the particulates of polyimide (E) having the glass transition temperature of 270° C. or higher are insoluble in the resin composition.

11. The composite material according to claim 6, wherein the alkenyl aromatic comonomer (C) is styrene, 1,4-divinylbenzene, a diallyl phthalate monomer, triallyl isocyanurate or glyceryl triacrylate.

* * * * *